E. GEORGE, Jr.
COUPLING AND DRAFT YOKE CONNECTION.
APPLICATION FILED JUNE 4, 1920.
1,364,047.
Patented Dec. 28, 1920.
2 SHEETS—SHEET 1.
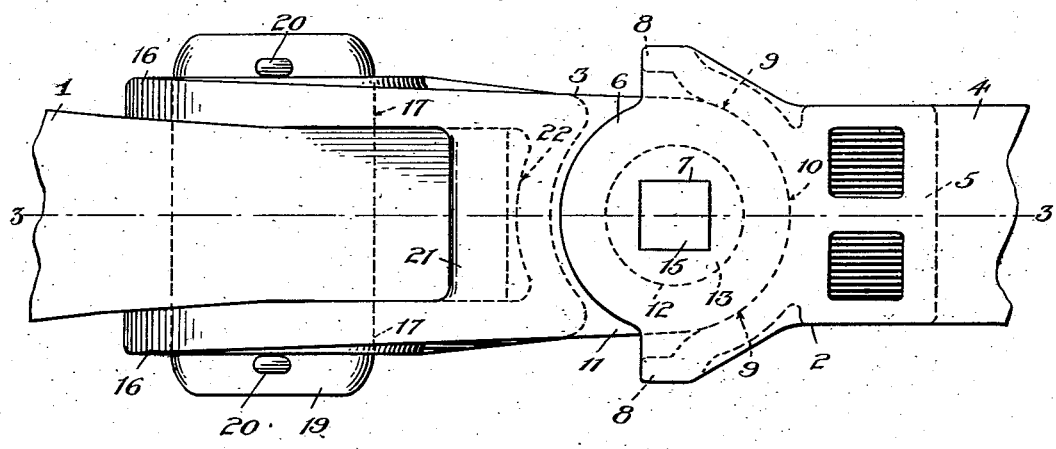
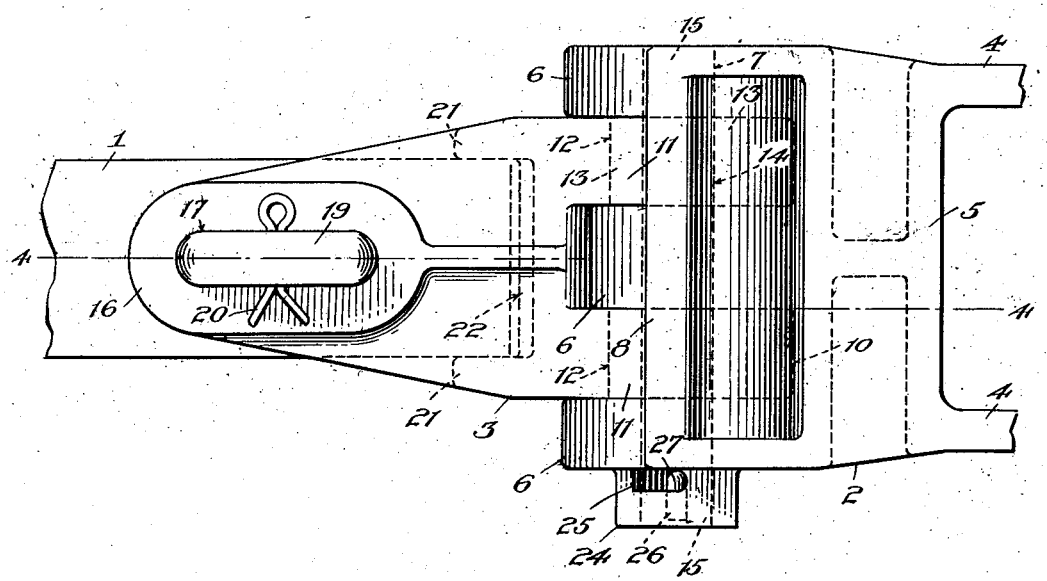
Witness
Edwin L. Bradford
Inventor
Enoch George, Jr.
By Ritter & Ritter
his Attorneys

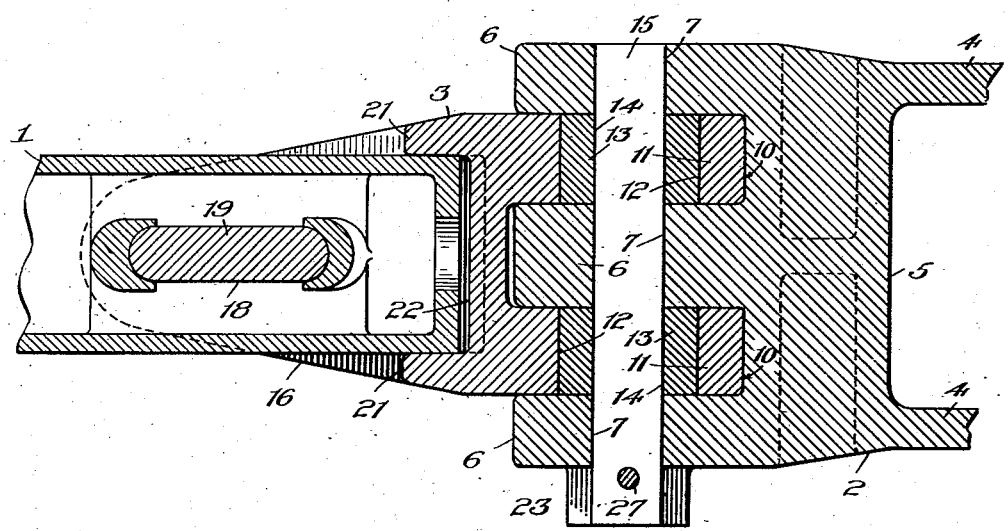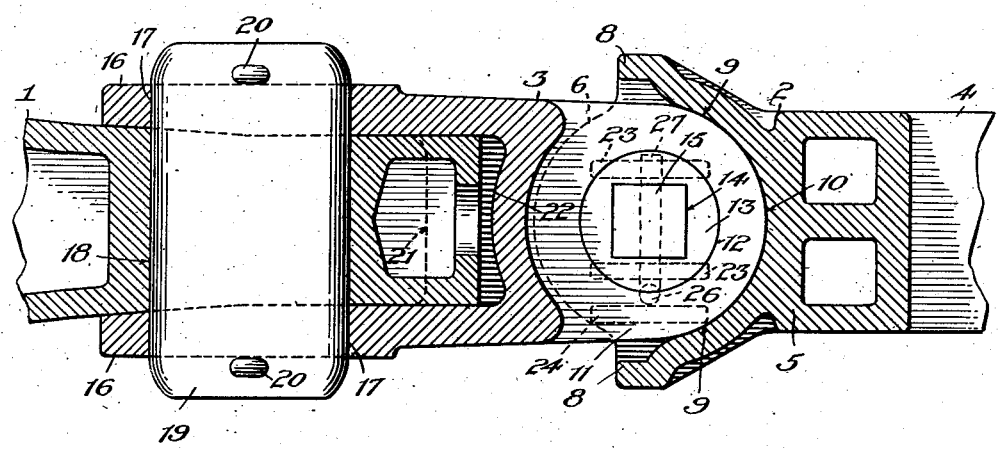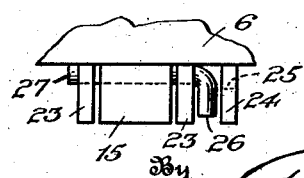

UNITED STATES PATENT OFFICE.

ENOCH GEORGE, JR., OF PITTSBURGH, PENNSYLVANIA, ASSIGNOR TO THE McCONWAY & TORLEY COMPANY, OF PITTSBURGH, PENNSYLVANIA, A CORPORATION OF PENNSYLVANIA.

COUPLING AND DRAFT-YOKE CONNECTION.

1,364,047.  Specification of Letters Patent.  Patented Dec. 28, 1920.

Application filed June 4, 1920. Serial No. 386,606.

*To all whom it may concern:*

Be it known that I, ENOCH GEORGE, Jr., a citizen of the United States, residing at Pittsburgh, in the county of Allegheny and State of Pennsylvania, have invented certain new and useful Improvements in Coupling and Draft-Yoke Connections; and I do hereby declare the following to be a full, clear, and exact description of the invention, such as will enable others skilled in the art to which it appertains to make and use the same.

My invention relates to a coupler and draft yoke connection for the draft appliances of railway vehicles, and has for its object to provide means whereby a coupler which is not primarily designed to be pivotally attached to a draft yoke may be pivotally connected thereto in a strong, durable and efficient manner so as to be capable of extended lateral swinging movements with respect to the yoke.

Generally stated, the principal features of the invention, both in respect to basic combinations of elements and preferred structural details, may be said to reside in the combination of a coupler having a stem, a yoke provided with arms adapted to receive a cushioning unit between them and having a plurality of spaced apertured lugs at its forward end, and a member intermediate of and connected to the coupler stem and yoke, the intermediate member being provided at its rear end with spaced lugs which mesh with the spaced lugs upon the forward end of the yoke, the said lugs of the intermediate member being provided with alined apertures in which are respectively mounted circular pivot bushings having polygonal openings therethrough, and a pin of polygonal cross section which extends through corresponding openings in the yoke lugs and through the holes in the bushings being employed to prevent the latter from rotating with respect to the yoke and pin.

In the drawings illustrating the preferred embodiment of my invention, the scope whereof is pointed out in the claims,—

Figure 1 is a plan view of a coupler and draft yoke connection embodying the invention, the forward end of the coupler and the rear end of the yoke being broken away.

Fig. 2 is a side elevation of the construction shown in Fig. 1.

Fig. 3 is a vertical section on the line 3—3, Fig. 1.

Fig. 4 is a horizontal section on the line 4—4, Fig. 2.

Fig. 5 is a detail view showing in front elevation a convenient means for retaining the downwardly removable connecting pin in assembled position.

In the drawings, 1 is the stem of a car coupler, 2 is a draft yoke, and 3 is the intermediate member through the intervention of which the connection of the coupler stem 1 with the draft yoke 2 is effected.

As a means for coöperating with the usual cushioning unit (not shown), the yoke 2 is preferably provided with the well known vertically alined parallel arms 4 which are rigidly connected at their rear ends, and between which the cushioning unit is received. The yoke arms 4 are integrally united at their forward ends by a transversely extending tie 5 which is adapted to engage the forward end of the cushioning unit and to communicate buffing shocks to the latter. The transversely extending tie 5 also integrally units the spaced lugs 6 with which the yoke 2 is provided at its forward end. These lugs are provided with alined apertures 7 which are preferably of non-circular or polygonal contour and, as shown, may advantageously be of square or rectangular form. It is also preferred integrally to unite the lugs 6 in advance of the tie member 5 by means of vertically extending side walls 8. To allow for the pivotal movement of the intermediate member 3, as well as to permit the latter to deliver buffing shocks directly to the yoke, it is preferred to form the inner faces 9 of the side walls 8 and to form the forward face 10 of the transverse tie 5 as cylindrical surfaces whose axis of curvature corresponds or substantially corresponds to the pivotal axis of the intermediate member 3 to which the stem 1 of the car coupler is secured.

The intermediate member 3 is provided at its rear end with a pair of spaced pivot lugs 11 having circularly curved rear ends which correspond to the curvature of the inner faces 9 of the side walls 8 of the yoke and also to that of the forward face 10 of the transverse tie 5. Each of the pivot lugs 11 is provided with a circular opening 12 in which fits a corresponding circular bushing 13. Each of these bushings has an aperture 14 corresponding in form to the apertures 7 in the lugs 6 at the forward end of the draft yoke, the several apertures 7 and 14 illustrated in the drawings being shown as adapted to receive a vertically extending pin 15 of square cross section. Forwardly of the pivot lugs 11 and integrally connected thereto, the intermediate member 3 is provided with spaced arms 16 between which the rear end of the coupler stem 1 is adapted to extend and to which said stem is connected. For the purpose of connecting the coupler stem to the intermediate member 3 it is preferred to provide the arms 16 of the latter with horizontally alined slots 17 corresponding to a transversely extending key slot 18 in the coupler stem 1 near the rear end thereof and to pass a key 19 through the said slots. Cotters 20 extending through the key 19 outside of the arms 16 of the intermediate member 3 afford a simple means for retaining the key in assembled position. At their inner ends the slotted arms 16 are integrally united by transversely extending webs 21 which overlap the rear end of the coupler stem and in conjunction with the adjacent portions of the arms 16 of the intermediate member form a socket for the reception of the rear end of the coupler stem. That conditions incident to wear due to long service of the device may not result in causing buffing shocks to be unequally distributed to the intermediate member 3, the latter is preferably provided at the rear end of the socket formed by the arms 16 and webs 21 with a convexly curved face 22, thus insuring against the possibility of the rear end of the coupler stem localizing the buffing shocks at a point removed from the longitudinal axis of the intermediate member.

A suitable means for maintaining the downwardly removable pin 15 in assembled relation consists in forming upon the underside of the yoke 2 a plurality of perforated spaced lugs 23 and 24, respectively, the lower end of the pin 15 being adapted to extend between the lugs 23, and the lug 24 being provided with an elongated slot 25 permitting the passage of the bent end 26 of a bar or rod 27 which passes through the perforations in the lugs 23 and through a corresponding perforation in the pin 15. As will be readily understood, the locking bar 27 is placed in assembled position by turning it until its bent end 26 will pass through the slot 25 in the lug 24, after which it may be passed through said lug 24 and the apertures in the lugs 23 and pin 25, and its bent end 26 allowed to swing vertically downward so as to stand between the guard lug 24 and the adjacent lug 23.

In assembling the device the pivot bushings 13 are inserted in the apertures 12 of the pivot lugs 11 and the latter are then caused to mesh with the spaced lugs 6 at the forward end of the draft yoke. The polygonal pin 15 is then inserted in the apertures of the lugs 6 and pivot bushings 13 and the locking bar is put in place. The coupler may then be connected to the intermediate member 3 by entering its stem 1 between the slotted arms 16 of the latter and passing the key 19 through the key slot in the coupler stem and those in the arms 16.

By my invention a large area is provided for resisting the wear due to the pivotal movement of the coupler with respect to the yoke, the pin which connects the intermediate member to the yoke is prevented from being weakened by wear, and the use of pivot bushings, while affording large wearing surface, stiffen the pivot lugs of the intermediate member against distortion incident to the transmission of heavy buffing shocks directly to the transversely extending tie member 5 at the forward end of the cushioning unit.

I claim:—

1. In a coupler and yoke connection, the combination with a coupler having a stem, of a yoke, a member intermediate of and connected to said coupler stem and yoke, said intermediate member having rigidly united portions adapted to receive the rear end of said coupler stem between them and being provided with a plurality of rigidly connected spaced lugs having alined apertures rearwardly of the coupler stem, and said yoke being provided at its forward end with a plurality of spaced apertured lugs between adjacent ones of which the said lugs of the intermediate member respectively extend, means extending into said apertures of said lugs for pivotally connecting said intermediate member and yoke, said means involving bushings revolubly mounted in some of said lugs, and means for connecting said intermediate member to the coupler.

2. In a coupler and yoke connection, the combination with a coupler having a stem, of a yoke having arms adapted to receive a cushioning unit between them, a member intermediate of and connected to said coupler stem and yoke, said intermediate member being provided at its rear end with spaced pivot lugs having alined apertures therein, said yoke being provided at its forward end with a plurality of spaced lugs having apertures therein, circular pivot bushings mounted in the respective apertures of the lugs of said intermediate member and maintained in spaced relation by one of said lugs of said yoke, a pin extending into the apertures of said lugs on the yoke and intermediate member and through said bushings, and means for connecting said intermediate member to said coupler stem.

3. In a coupler and yoke connection, the combination with a coupler having a stem, of a yoke, a member intermediate of said coupler and yoke, means for connecting said intermediate member to the stem of said coupler, and means for pivotally connecting said intermediate member to said yoke, said last named means involving overlapping apertured lugs formed on the members to be connected, the apertures in alternate overlapping lugs being circular and non-circular, respectively, each of said circular apertures being provided with a circular bushing having a non-circular opening therein, and a pin of non-circular cross section extending into the non-circular apertures of the lugs and the aperture of each bushing.

4. In a coupler and yoke connection, the combination with a coupler having a stem, of a yoke, a member intermediate of and connected to said coupler stem and yoke, said intermediate member being provided rearwardly of the coupler stem with spaced pivot lugs having circular apertures therein, said yoke being provided at its forward end with spaced lugs having polygonal apertures therein, spaced circular pivot bushings respectively disposed in the apertures of the pivot lugs of said intermediate member, a polygonal pin extending through the apertures of said lugs of the yoke and through said pivot bushings, and means for connecting said intermediate member to the stem of said coupler.

5. In a coupler and yoke connection, the combination with a coupler having a stem, of a yoke, and means for pivotally connecting said coupler and yoke, said means involving overlapping apertured lugs some of which are rigid with the yoke, pivot bushings journaled in a plurality of said lugs and having non-circular apertures therein, and a pin of non-circular cross section extending into the said apertures of the said lugs and pivot bushings.

6. In a coupler and yoke connection, the combination of a coupler member and a yoke member each having perforated lugs, the perforations in the lugs of one of said members being circular and those in the other non-circular, said lugs being adapted to overlap, bushings for the circular openings of said lugs, said bushings having non-circular openings therein, and a non-circular pin for connecting the members.

7. In a coupler and yoke connection, the combination with a coupler having a stem, of a yoke, a member intermediate of and connected to said coupler stem and yoke, means for pivotally connecting said intermediate member to said yoke, and means for connecting said intermediate member to said coupler stem, said intermediate member being provided with a socket adapted to receive the rear end of said coupler stem, and said socket being formed at its inner end with a convexly curved face extending behind said coupler stem.

In testimony whereof I affix my signature.

ENOCH GEORGE, Jr.